United States Patent
Ravenscroft et al.

(10) Patent No.: US 6,466,663 B1
(45) Date of Patent: *Oct. 15, 2002

(54) MONITORING SYSTEM CLIENT FOR A CALL CENTER

(76) Inventors: Don Ravenscroft, 3937 Whisper Hollow Dr., Colorado Springs, CO (US) 80920; Wesley Jon Atkinson, 22 Morning Star Cir., Woodland Park, CO (US) 80863; Richard McDuff, 9120 Bellcove Cir., Colorado Springs, CO (US) 80920; Gopi Shankar, 5362 N-Nevada Ave., #112, Colorado Springs, CO (US) 80918; Craig Kaley, 10632 Stoneflower Dr., Parker, CO (US) 80134; Craig Alan Baxter, 8495 Vance Ct., Colorado Springs, CO (US) 80920

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,549

(22) Filed: Sep. 30, 1997

(51) Int. Cl.[7] .............................................. H04M 3/00
(52) U.S. Cl. ....................... 379/265; 345/329; 345/348; 345/969
(58) Field of Search ................................ 379/265, 266, 379/309, 201; 345/326, 329, 334, 340, 348, 349, 356, 357, 970, 969

(56) References Cited

U.S. PATENT DOCUMENTS

| | | | |
|---|---|---|---|
| 4,510,351 A | 4/1985 | Costello et al. | 379/265.01 |
| 4,782,521 A | 11/1988 | Bartlett et al. | 379/354 |
| 5,097,528 A | 3/1992 | Gursahaney et al. | 379/88.21 |
| 5,099,510 A | 3/1992 | Blinken, Jr. et al. | 379/202.01 |
| 5,101,425 A * | 3/1992 | Darland et al. | 379/265 |
| 5,113,380 A | 5/1992 | Levine | 368/10 |
| 5,164,983 A | 11/1992 | Brown et al. | 379/265.03 |
| 5,226,120 A | 7/1993 | Brown et al. | 395/200 |
| 5,270,919 A | 12/1993 | Blake et al. | 370/400 |
| 5,289,368 A | 2/1994 | Jordan et al. | 705/8 |
| 5,309,504 A | 5/1994 | Morganstein | 379/67.1 |
| 5,393,964 A | 2/1995 | Hamilton et al. | 235/381 |

(List continued on next page.)

FOREIGN PATENT DOCUMENTS

| | | |
|---|---|---|
| EP | 0340665 | 11/1989 |
| EP | 0535270 | 4/1993 |
| GB | 0647050 A2 | 4/1995 |
| WO | 96/36157 | 11/1996 |

OTHER PUBLICATIONS

Foard, C. F.: "Teaming Switches And Computers for Customer Applications", AT&T Technology, vol. 6, No. 4, Jan. 1, 1991, pp. 32–38, XP000291998.

"Centre Vu™ Solutions Management Tools for Enhancing Call Center Performance", Lucent Technologies, 1997.

Kanzow et al., "Dienste und Netze Fuer Die Mulitmedia–Kommunikation";IT + IT Informationstechnik und Technische Informatik; vol. 36, No. 4/05, pp. 92–95, XP000468540.

*Engineering and Operations in the Bell System*, Bell Telephone Laboratories, Copyright 1977, pp. 503–504.

*Primary Examiner*—Ahmad Matar
*Assistant Examiner*—Benny Q. Tieu

(57) ABSTRACT

A monitoring system monitors calling activity within a call center. The monitoring system includes a client program that may be run on a workstation. The client program displays a graphical user interface that contains status information about agents in the call center and statistics regarding calling activity within the call center. The graphical user interface may depict a physical layout of all or a portion of the call center. Information about agents, supervisors, and business clients may be obtained from the graphical user interface.

42 Claims, 10 Drawing Sheets

U.S. PATENT DOCUMENTS

| | | | |
|---|---|---|---|
| 5,452,446 A | 9/1995 | Johnson | 707/1 |
| 5,457,738 A | 10/1995 | Sylvan | 379/93.03 |
| 5,463,731 A | 10/1995 | Diec et al. | 395/161 |
| 5,465,286 A * | 11/1995 | Clare et al. | 379/265 |
| 5,483,586 A | 1/1996 | Sussman | 379/218.01 |
| 5,491,797 A | 2/1996 | Thompson et al. | 709/204 |
| 5,499,291 A | 3/1996 | Kepley | 379/265.06 |
| 5,506,897 A | 4/1996 | Moore et al. | 379/220.01 |
| 5,511,117 A | 4/1996 | Zazzera | 379/265.03 |
| 5,519,773 A | 5/1996 | Dumas et al. | 379/265.05 |
| 5,535,256 A | 7/1996 | Maloney et al. | 379/309 |
| 4,455,455 A | 8/1996 | Little | 379/203.01 |
| 5,542,350 A | 8/1996 | Theilacker et al. | 101/228 |
| 5,546,449 A | 8/1996 | Hogan et al. | 379/202.01 |
| 5,577,112 A | 11/1996 | Cambray et al. | 379/216 |
| 5,602,730 A | 2/1997 | Coleman et al. | 705/15 |
| 5,625,683 A | 3/1997 | Nazanin et al. | 379/355.06 |
| 5,621,789 A * | 4/1997 | McCalmont et al. | 379/265 |
| 5,675,630 A | 10/1997 | Beatty | 455/551 |
| 5,675,637 A | 10/1997 | Szlam et al. | 379/142.17 |
| 5,696,811 A * | 12/1997 | Maloney et al. | 379/265 |
| 5,703,943 A | 12/1997 | Otto | 379/265.11 |
| 5,710,887 A | 1/1998 | Chellaiah et al. | 705/26 |
| 5,715,307 A | 2/1998 | Zazzera | 379/265.03 |
| 5,757,904 A | 5/1998 | Anderson | 379/265.06 |
| 5,761,502 A | 6/1998 | Jacobs | 707/103 |
| 5,781,735 A | 7/1998 | Southard | 709/224 |
| 5,784,452 A * | 7/1998 | Carney | 379/269 |
| 5,790,635 A | 8/1998 | Dezonno | 379/32.04 |
| 5,790,798 A | 8/1998 | Beckett, II et al. | 709/224 |
| 5,815,554 A | 9/1998 | Burgess et al. | 379/90.01 |
| 5,815,566 A | 9/1998 | Ramot et al. | 379/210.01 |
| 5,818,907 A | 10/1998 | Maloney et al. | 379/32.01 |
| 5,822,400 A | 10/1998 | Smith | 379/32.02 |
| 5,838,682 A | 11/1998 | Dekelbaum et al. | 370/401 |
| 5,848,356 A | 12/1998 | Jambhekar et al. | 455/403 |
| 5,850,433 A | 12/1998 | Rondeau | 379/218.01 |
| 5,854,825 A | 12/1998 | Mukaihara et al. | 379/309 |
| 5,864,616 A | 1/1999 | Hartmeier | 379/265.03 |
| 5,867,495 A | 2/1999 | Elliot et al. | 370/352 |
| 5,884,032 A | 3/1999 | Bateman et al. | 709/204 |
| 5,926,538 A | 7/1999 | Deryugin et al. | 379/265.03 |
| 5,933,492 A | 8/1999 | Turovski | 379/265.02 |
| 5,946,375 A | 8/1999 | Pattison et al. | 379/112.01 |
| 5,946,386 A | 8/1999 | Rogers et al. | 379/265.09 |
| 5,948,632 A | 9/1999 | Moritani et al. | |
| 5,970,134 A | 10/1999 | Highland et al. | 379/265.02 |
| RE36,416 E | 11/1999 | Szlam et al. | 379/88.09 |
| 5,991,390 A | 11/1999 | Booton | 379/265.02 |
| 6,032,184 A | 2/2000 | Cogger et al. | 709/223 |
| 6,055,308 A | 4/2000 | Miloslavsky et al. | 379/265.03 |
| 6,058,163 A | 5/2000 | Pattison et al. | 379/265.06 |
| 6,115,040 A | 9/2000 | Bladow et al. | 345/741 |
| 6,134,318 A * | 10/2000 | O'Neil | 379/266 |
| 6,137,862 A | 10/2000 | Atkinson et al. | 379/32.01 |
| 6,141,412 A | 10/2000 | Smith et al. | 379/265.14 |
| 5,915,012 A | 11/2000 | Miloslavsky | 379/265.02 |
| 6,148,065 A | 11/2000 | Katz | 379/88.2 |
| 6,148,074 A | 11/2000 | Milosalavsky | 379/242 |
| 6,192,121 B1 | 2/2001 | Atkinson et al. | 379/265.01 |

* cited by examiner

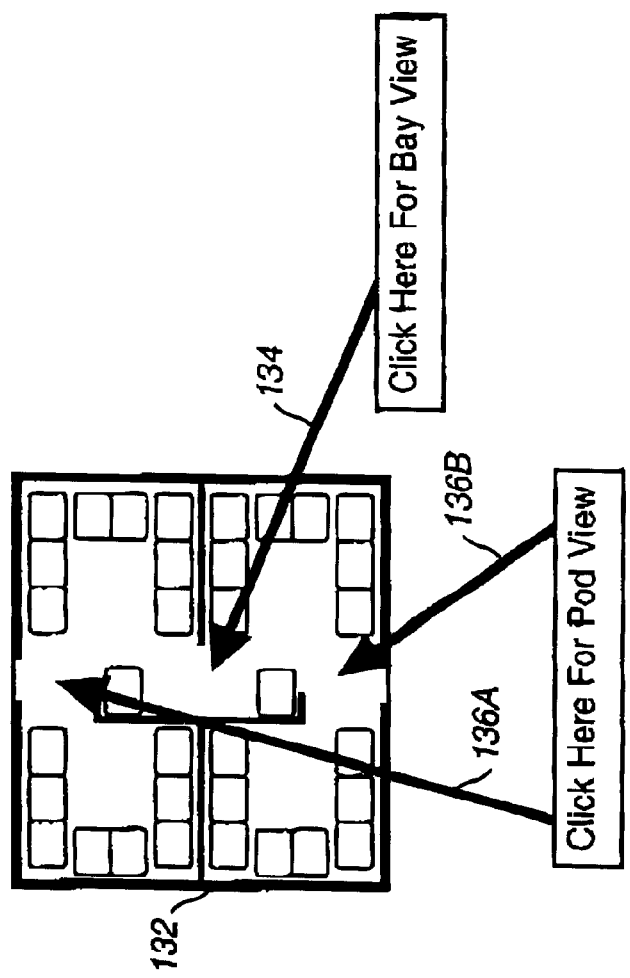

MONITORING SYSTEM CLIENT FOR A CALL CENTER

TECHNICAL FIELD

The present invention relates generally to telecommunications systems and, more particularly, to a monitoring system client for a call center.

BACKGROUND OF THE INVENTION

A typical call center includes a number of agents who field inbound telephone calls and place outbound telephone calls. Each agent has an associated station that includes a personal computer or workstation, a phone pad and a head set. The agent may place outbound sales calls or field inbound calls (such as 800 number calls) from potential customers. The agents are organized into groups and the agents have supervisors, who are responsible for supervising the agents. Each agent may receive or place calls for different business clients.

One of the difficulties encountered in such a call center is the difficulty of monitoring the phone activity of the agents. It is difficult for a supervisor to obtain useful information about the activities of agents in a timely fashion. Such a lack of information makes it difficult for a supervisor to properly manage the agents and increase the profitability of the call center. In general, a supervisor must perform manual analysis and calculation to obtain useful data regarding agent performance.

SUMMARY OF THE INVENTION

The present invention addresses the limitations of the prior art by providing a computerized monitoring system for monitoring activities of agents within a call center. The monitoring system may display status information and statistics regarding agent activity as part of a graphical user interface. The graphical user interface may include graphical as well as textual information to display the information in a useful and intuitive format. The monitoring system may enable a supervisor to view information regarding all of the agents under supervision. In addition, multiple views may be available via the monitoring system. For example, a view that depicts all of the agents in the call center may be available as well as views that depict selected subsets of the agents within the call center.

In accordance with a first aspect of the present invention a method of monitoring activity of an agent within a call center is practiced on a computer system. A graphical user interface is displayed on a display device that depicts at least a portion of the physical layout of the call center. Status information regarding the activity of an agent is received, and graphical information about the agent is displayed as part of the graphical user interface, where the graphical information provides a visual cue of the received status information to a user of the computer.

In accordance with another aspect of the present invention, a method is practiced in a computer system that has a display device. A user interface that depicts agent stations for at least a selected portion of the call center is displayed on the display device. Information about calling activity at agent stations of the call center is received. Information about the calling activity of the agent stations in the selected portion of the call center is displayed as part of the user interface. The information is displayed in proximity to the depiction of the agent station in the user interface.

In accordance with a further aspect of the present invention statistics regarding handling of calls by agents are provided in a computer system. The statistics are displayed on a display device on a per agent basis.

In accordance with a further aspect of the present invention a method of monitoring calling activity by agents in a call center is practiced in the computer system. The system identifies which agents are supervised by a supervisor and displays calling activity information about the agents and a single view on the display device.

In accordance with an additional aspect of the present invention, a call center that processes calls on behalf of a client includes agent stations where agents are stationed to process calls. The call center also includes a server for generating information regarding calling activity by agents. The call center includes a computer system that has an output device and a program for producing a graphical user interface. Information regarding calling activity is received from a server. The user determines what view of the call center is displayed by the computer system. Each view depicts a subset of the agent stations in the call center. A graphical user interface is displayed that depicts each of the agent stations within the determined view. Information about the calling activity of agent stations and the determined view is displayed as part of the graphical user interface.

BRIEF DESCRIPTION OF THE DRAWINGS

A preferred embodiment of the present invention will be described below relative to the following figures.

FIG. 5 depicts a pop-up window that displays information about a business client.

FIG. 6 depicts hot spots for navigating to display a bay view or pod view.

FIG. 7 is a screen shot that depicts a window produced by the monitoring system client where a bay view is displayed that contains call statistics.

DETAILED DESCRIPTION OF THE INVENTION

The preferred embodiment of the present invention provides a monitoring system for a call center. The monitoring system includes a client application program that displays information regarding agent activity and call statistics on an intuitive user interface. The user interface shows the physical layout of the call center and displays useful information about agents and calling activity. The client application program may provide different views of the call center. In particular, the client application program may display the entire call center, a single bay of the call center or a single pod of the call center.

The user interface of the client application program display, information regarding each agent, including, agent name, average handling time (AHT), average work time (AWT) and average talk time (ATT). Information regarding how many calls an agent has handled relative to a particular business client is also maintained. Graphical information is displayed to indicate whether an agent is available, unavailable, working on a call, or is in an error or unknown state.

The client application program also displays statistical information regarding call types. For example, the statistical information may be displayed that specifies the number of outbound calls, the number of internal calls (i.e., within the call center) and the number of inbound calls currently being handled. Statistical information may also be displayed regarding calls on a per business client basis. Statistics regarding how many calls were received for each type of business client that is being serviced by the call center may also be displayed. The statistics may be displayed in graphical format to provide a visual tool for analyzing activity within the call center.

Figure 1:
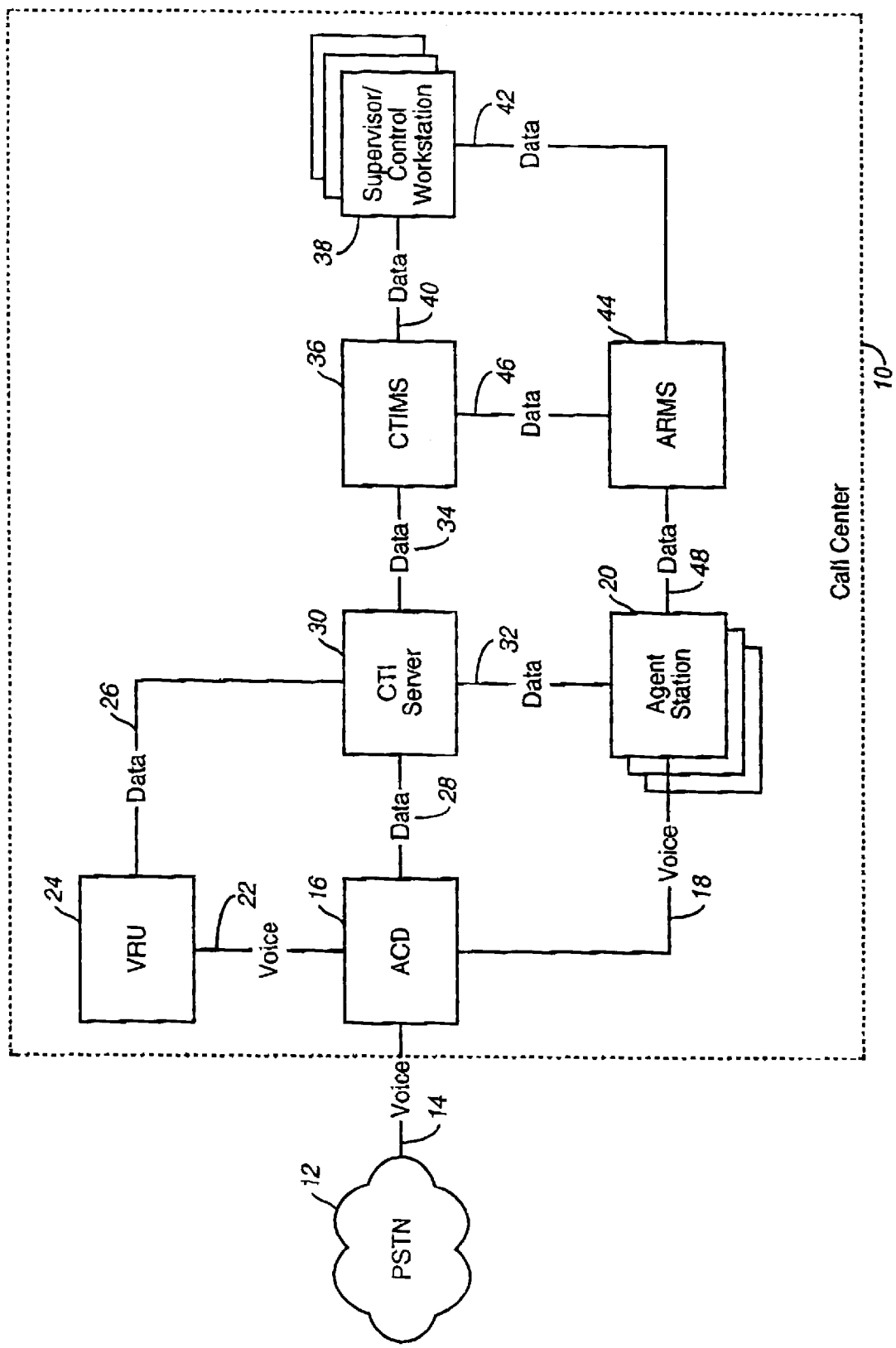
FIG. 1 is a block diagram of a portion of a telecommunications system that is suitable for practicing a preferred embodiment of the present invention.

FIG. 1 is a block diagram that illustrates a portion of a telecommunications network that is suitable for practicing the preferred embodiment of the present invention. The telecommunications network includes a call center 10 that is connected to a public switched telephone network (PSTN) 12 via a voice trunk 14. Those skilled in the art will appreciate that the call center 10 may also be alternatively connected to other types of networks from which calls may originate. The call center 10 includes an automatic call distributor (ACD) 16 or other switching mechanism for distributing incoming calls within the call center. The ACD 16 is connected via a voice trunk 18 to agent stations 20. These agent stations 20 include a workstation or personal computer, a phone pad and a head set. Agents are stationed at the stations 20, and the agents utilize the resources contained therein to process calls. The ACD 16 is also connected via a voice trunk 22 to a voice response unit (VRU) 24. The VRU 24 automates call processing. The VRU 24 may be used to collect information such as account numbers, credit card numbers and service requests from a caller. The VRU 24 is connected to a computer/telephone integration (CTI) server 30 via a data link 26. The CTI server 30 extracts call data from the ACD 16. In particular, the CTI server 30 abstracts raw call data from the ACD 16 into useful statistical data. The CTI server 30 also distributes data in the form of events. The CTI server 30 may run as a separate process on a dedicated computer system. A suitable CTI server is the T Server produced by Genesys Labs of San Bruno, California. The CTI server 30 is connected to the ACD 16 via data link 28 and is connected to the agent stations 20 via data link 32.

CTI monitoring server (CTIMS) 36 is connected to the CTI server 30 via data link 34. CTIMS 36 may be implemented on a dedicated computer or on a shared computer. CTIMS 36 compiles statistical data that is collected from the CTI server 30 into useful data for presentation and management at the supervisor/control workstations 38. This data is utilized by the client application program of the preferred embodiment of the present invention, as will be described in more detail below. CTIMS 36 registers with the CTI server 30 to receive all events that are output by the CTI server 30. Examples of events that are output by the CTI server 30 include events indicating calls received, calls routed, calls answered, and calls disconnected. CTIMS 36 categorizes the events into groups, such as by agent, by supervisor, by call type, by business type and the like. CTIMS 36 also calculates certain statistics such as average call handling times. A suitable implementation of CTIMS is described in copending), application entitled, "Computer/Telephony Interface Monitoring Server," which is explicitly incorporated by reference herein.

The CTIMS 36 is connected to an automated resource management system (ARMS) 44 via data link 46. ARMS 44 provides management of resource data for the call center. ARMS 44 is largely a database on a server that contains interfaces for access by CTIMS 36 and supervisor/control workstations 38.

It should be appreciated that data links 26, 32, 34, 40, 42, and 48 ay all be implemented as local area network (LAN) connections. A suitable LAN is an Ethernet LAN.

Figure 2:
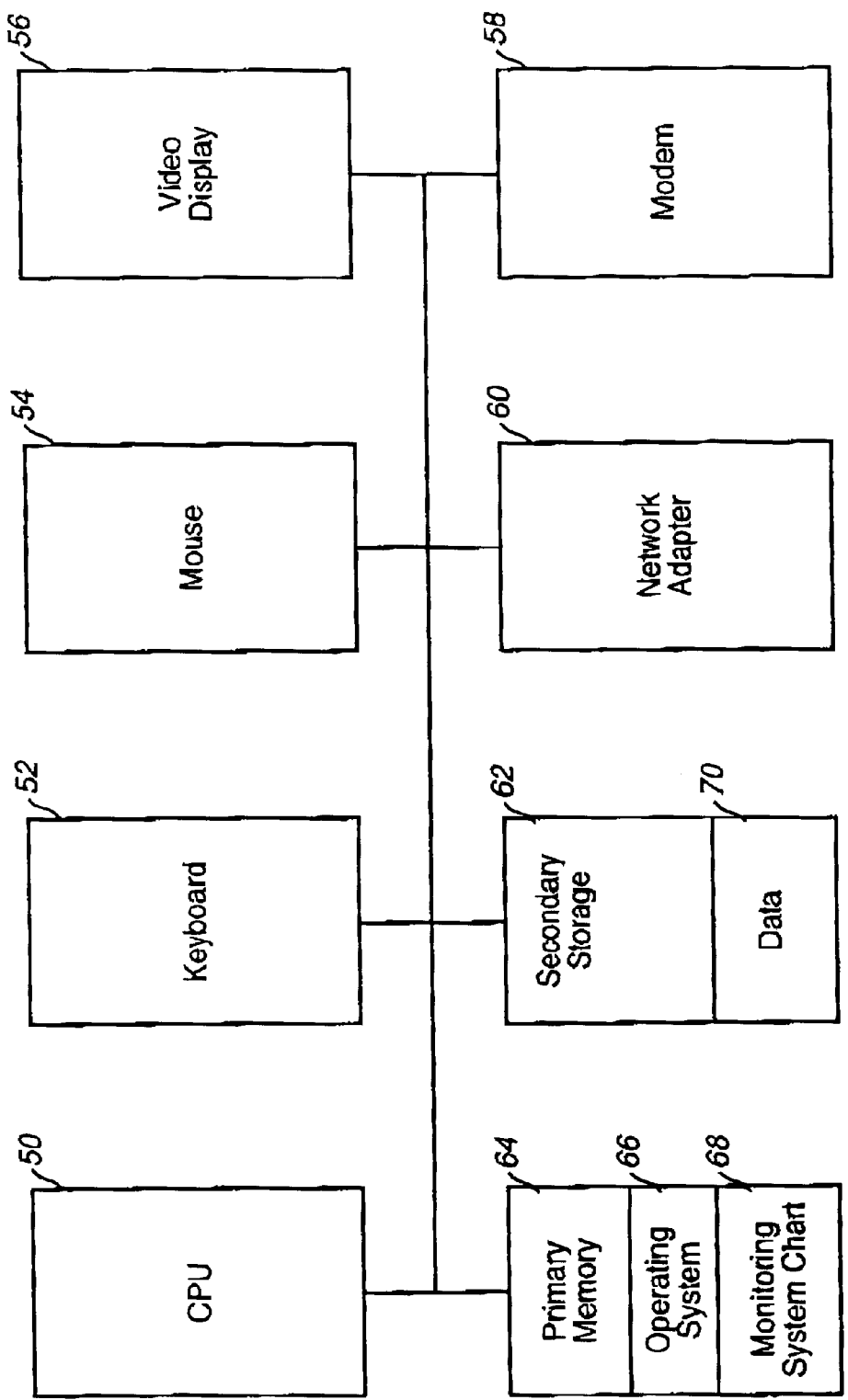
FIG. 2 is a block diagram that illustrates the supervisor/control workstation of FIG. 1 in more detail.

The supervisor/control workstations 38 are the personal computers or workstations that are used by agent supervisors. FIG. 2 depicts the format of a suitable supervisor/control workstation 38 for practicing the preferred embodiment of the present invention. The workstation 38 includes a central processing unit (CPU) 50 for overseeing operation of the workstation. The workstation 38 may also include a number of peripheral devices, including a keyboard 52, a mouse 54 and a video display 56. A modem 58 may be included for enabling the workstation 38 to communicate with remote computing resources over conventional telephone lines. A network adapter 60 may be included to enable the workstation 38 to be connected to a local area network. The workstation 38 includes both primary memory 64 and secondary storage 62. The primary memory 64 may hold a number of different types of data and programs. These programs may include an operating system 66 and a client application program 68 that is responsible for providing a graphical user interface (GUI) to the use of the workstation 38 to display information regarding call center activity. The client application program 68 is known as the monitoring system client. The secondary storage may hold data 70 that is used by the monitoring system client 68.

Those skilled in the art will appreciate that the call center 10 may have a different configuration than that depicted in FIG. 1. Those skilled in the art will also appreciate that the workstation depicted in FIG. 2 is intended to be merely illustrative and not limiting of the present invention. The present invention may be practiced with different call center configurations and workstation configurations.

Before reviewing operation of the monitoring system client 68 in more detail, it is useful to review how calls are processed by the call center 10. Initially, a call originates from the PSTN 12 and is sent over the voice trunk 14 to the ACD 16. The ACD 16 decides where the call should be sent. The call is routed over voice trunk 22 to the VRU 24. The VRU 24 includes voice messages for obtaining information from the caller. As was mentioned above, the VRU 24 may collect information such as account numbers, credit card numbers and service requests. The gathered information is passed over the data link 26 to the CTI server 30. The CTI server 30, in turn, passes the data to the agent workstation 20 that will be servicing the call. The ACD 16 then switches the call to the agent station 20 that is to handle the call. An application may be run on the agent workstation to provide a screen pop with the information that has been collected by the VRU 24 so that the agent at the agent station 20 has the collected information available. The agent accepts the call and processes it accordingly. Additional information about the caller may be retrieved from ARMS 44.

As was mentioned above, the ACD 16 outputs information regarding the routing and processing of calls over data link 28 to the CTI server 30. The CTI server 30 outputs events that are received by CTIMS 36 over data link 34. These events are processed and categorized by CTIMS 36 and sent over data link 40 to the monitoring system client 68. The monitoring system client 68 uses this information to generate the GUI on the video display 56 to help the supervisor monitor activity within the call center. The GUI will be described in more detail below.

It should be appreciated that the monitoring system client 68 receives two types of information from the CTIMS 36. Sockets, such as found in the UNIX operating system, are used for interprocess communication between the monitoring system client 68 and CTIMS 36. A separate socket is provided for each type of information. The first type of information is state change information that indicates a change in the state of an agent. An agent may generally be in one of the following states: unavailable, available, call work, on call, error or unknown. When the agent is in an unavailable state, the agent is not available for processing calls. When the agent is in an available state, the agent is not currently processing a call and is available to process calls. When the agent is in the on call state, the agent is handling a call. When the agent is in the call work state, the agent is done handling a call but is working on the call data. When the agent is in an error state, an error has occurred. An agent also may be in an unknown state. The system also monitors call type. Examples of call type are outbound call, conference call, internal call or business call (wherein the business is known).

When an agent changes states (e.g., completes a call), CTIMS 36 sends an event that specifies the change in state. For example, if an agent changes from being unavailable to available, CTIMS 36 generates an event that is sent to the monitoring system client 68.

CTIMS 36 also provides a second type of information: statistical information. This statistical information is used by the monitoring system client 68 and is displayed as part of the GUI produced by the monitoring system client. For purposes of efficiency, the statistical information is not continuously fed to the workstation 38; rather, the monitoring system client 68 polls CTIMS 36 on a periodic basis (such as every 5 seconds) to receive updated statistical information from the CTIMS. The monitoring system client 68 includes code for receiving the statistics and updating information accordingly.

Figure 3:
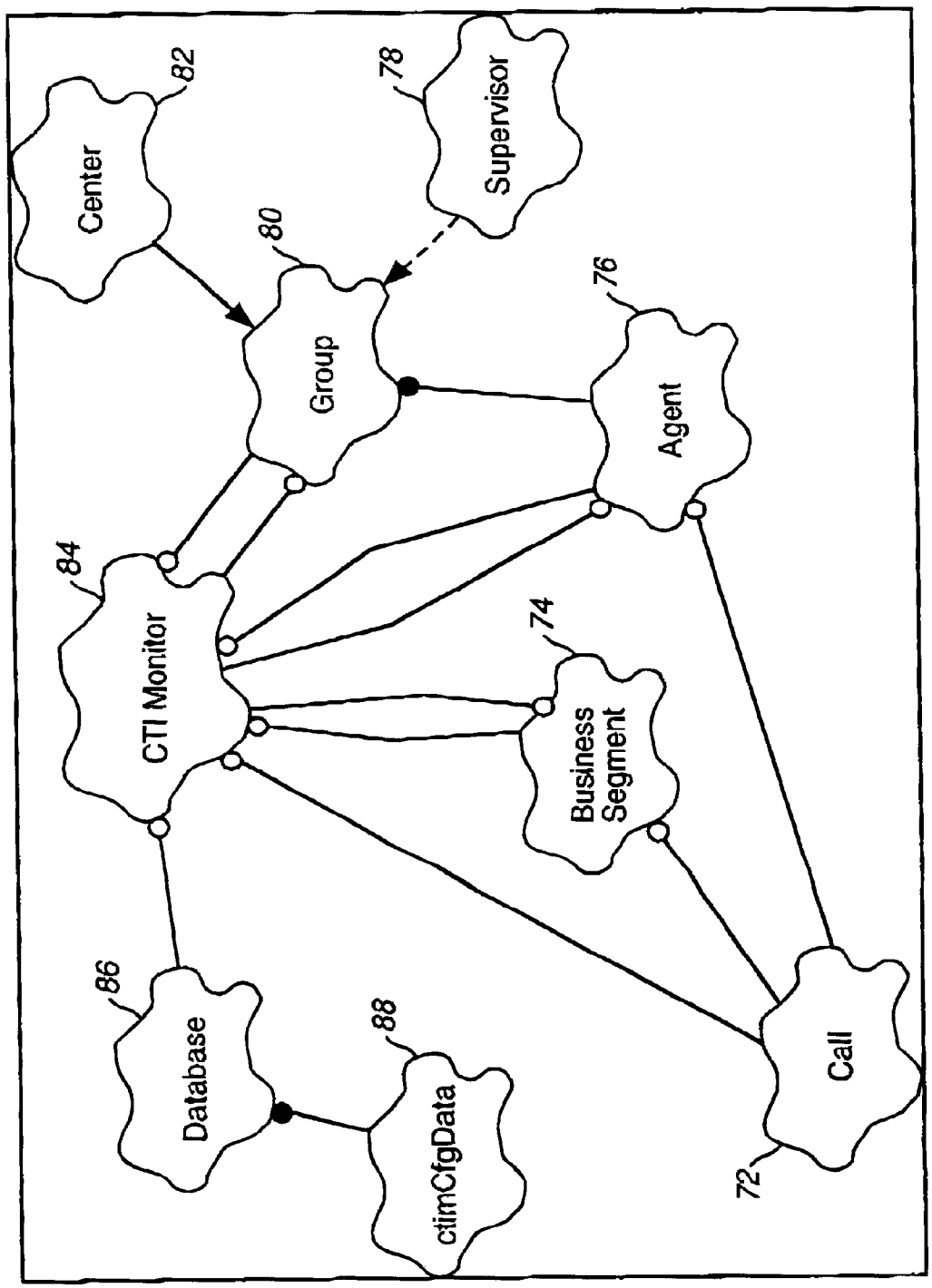
FIG. 3 depicts an object architecture that is suitable for practicing the preferred embodiment of the present invention.

The monitoring system adopts an object-oriented architecture. FIG. 3 illustrates a number of the object classes that are utilized within this architecture. Business objects are provided for each business client that is being; serviced by the call center. The business objects are of the business object class 74. Agent objects are created for each agent within the call center. The agent objects are of the agent object class 76 and hold information regarding specific agents in the call center. The agent objects may hold information regarding the identity of the agent, the supervisor of the agent, telephone information for the agent, statistical information regarding the agent, state information regarding the agent and the identity of businesses for which the agent may process calls. Information regarding supervisors of agents is stored in the objects of the supervisor object class 78. Each call center may have an associated center object of the center object class 82.

The group object class 80 is provided and serves as an abstract base class from which classes can be derived to maintain statistical information pertaining to a defined group of agents. Each group may have an associated object of the group object type 80. Each center object holds information regarding the associated call center.

The CTIMonitor object class 84 is for objects that are responsible for receiving and broadcasting information from and to the CTI server 30. This information may include agent user IDs and passwords, directory numbers assigned to agents and phone pads used by agents. The config object class 88 is for objects that maintain configuration information. Each socket has an associated instance of the IS ("intelligence service") object class 89. These sockets are used to communicate with instances of the monitoring system client that are of the UA ("user agent") object class 91.

ARMS 44 maintains information regarding the agents, supervisors and business information. As was mentioned above, this information is encapsulated into objects of different object classes. In particular, agent information is encapsulated into instances of the agent object type 76, information regarding supervisors is encapsulated into instances of the supervisor object type 78 and business information is encapsulated into objects of the business object type 74. CTIMS 36 maintains information about these objects and passes this information along with the statistical data to the monitoring system client 68 around on the supervisor/control workstations 38.

The monitoring system client 68 generates a GUI that depicts a portion or all of the call center. The physical layout for the call center is known to the monitoring system client 68. The monitoring system client 68 is also aware of what agents are currently processing calls in the call center and where the agents are stationed based upon information retrieved from the ARMS 44. The monitoring system client 68 additionally maintains statistical information regarding agents, supervisors and business segments. This information is utilized by the monitoring system client 68 to display appropriate information in the GUI.

The GUI generated by the monitoring system client 68 may display a number of different views. The call center is composed of a number of bays. Each bay includes two pods, and each pod includes a number of agent stations. The GUI may display an entire call center view, a bay view, or a pod view. Each of these views displays a different respective portion of the call center. These views allow a supervisor to view the entire call center or to focus on particular portions of the call center that are of interest.

Figure 4:
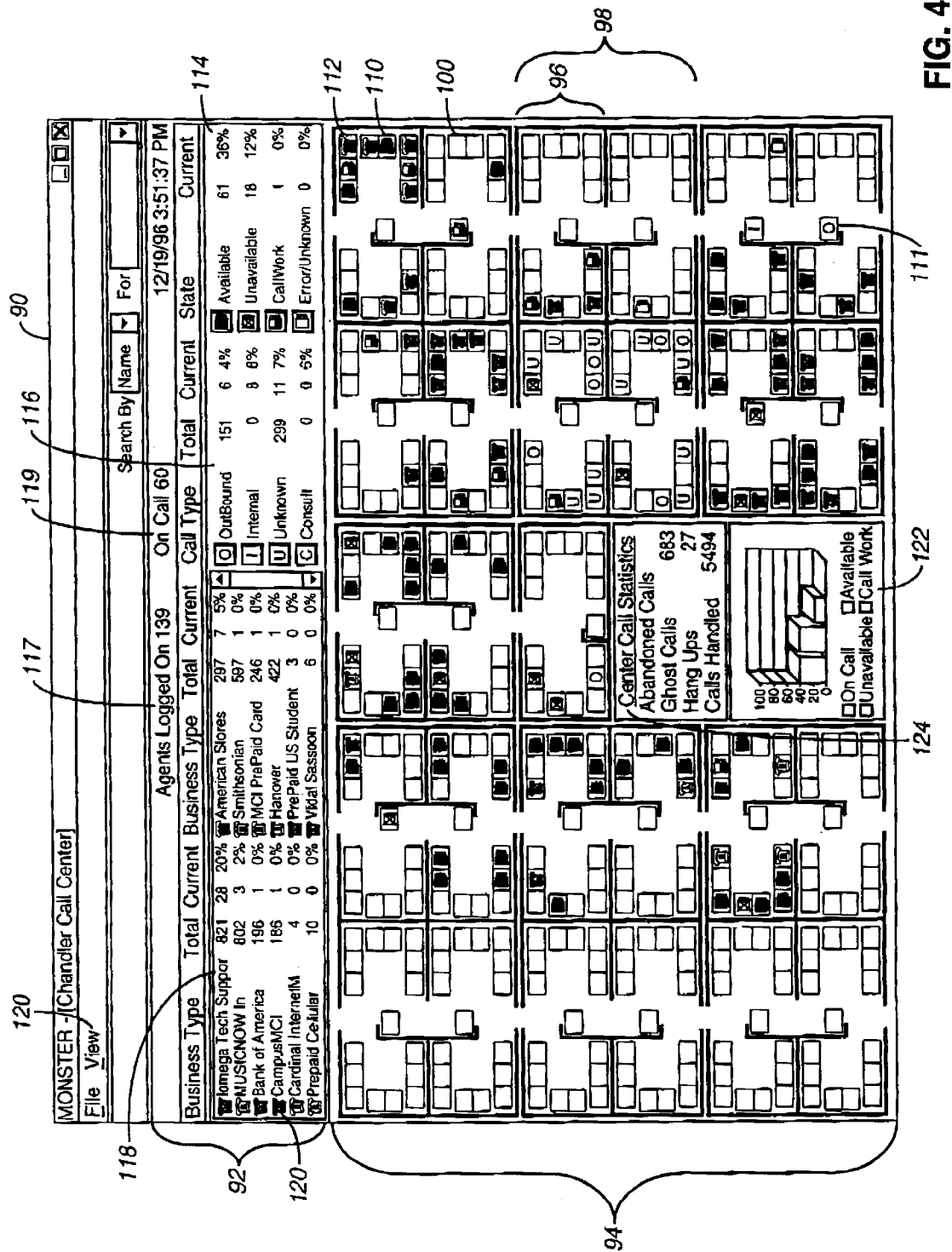
FIG. 4 shows a screen shot of a window produced by the monitoring system client that contains a complete call center view.

FIG. 4 depicts an example window 90 that is generated by the monitoring system client 68. The window 90 includes a statistics section 92 that displays statistics regarding calling activity and a call center section 94 that has at graphic layout modeling the physical layout of the call center. Agent stations are depicted as rectangular buttons 100 in FIG. 4. Each button may display an icon that indicates the agent state, call type or business type. For example, rectangle 110 holds an icon that provides a visual cue that the agent is unavailable. Rectangle 111 holds a letter (e.g., "O") that indicates that an outbound call is being processed by the agent at the associated agent station. Rectangle 112 holds an icon that indicates that the business client for which the agent is servicing a call. In general, if an agent is in the available state, the unavailable state or the error/unknown states, the icon associated with that state is displayed in the rectangle associated with the agent. If the agent is placing an outbound call, an internal call or an unknown call, the letter associated with that type of call is displayed in the rectangle for the agent. If the agent is processing a call that is associated with a given business, the icon for the business will be displayed in the rectangle for the agent. Those skilled in the art will appreciate that other types of activatable user interface elements, other than buttons, may be used to depict agent stations.

The statistics section 92 of the window 90 holds various statistics regarding calling activity within the current view. The state table 114 of the statistic section 92 specifies the number of agents that are currently available, unavailable, processing calls or in an error or unknown state. The percentage of these totals is also displayed. The call type area 116 displays statistics by call type. The number of outbound calls, the number of internal calls, the number of unknown calls and the number of consulting calls are all totaled and displayed within the call type area 116.

The business type area 118 of the statistics section 92 displays information regarding calls by business type. The icon associated with the business client and the name of the business client are displayed along with the total number of calls processed for the business, the current number of calls being processed for the business and percentages.

Summary statistics may also be displayed in the statistics section 92. For example, statistics 117 regarding the number of agents currently logged on in the call center and statistics 119 indicating the number of agents that are currently processing calls may be displayed.

Window 90 may also include a section 124 that holds call center statistics such as the number of abandoned calls, the number of ghost calls, the number of hang-ups and the number of calls handled. Graphical information 122 may also be displayed that shows the percentage of agents that are either on call, unavailable, available or call work.

The window 90 includes a menu bar that holds an entry 120 to access a view menu. The view menu enables a user to alter the view displayed within the window 90. As will be described in more detail below, the user may request the displaying of a call center view, a bay view, a pod view or a supervisor view.

The monitoring system client 68 also enables certain pop-up windows to be displayed. One of these pop-up windows is a window regarding information that is particular to a given business client. If a user positions a mouse cursor over the entry for the business type within the statistic section 92 and clicks, a pop-up window for the business client is displayed. FIG. 5 shows an example of such a pop-up window 126. The pop-up window 126 holds information that identifies the business client and holds summary statistics regarding calls processed for that business type. These summary statistics may include the number of agents on call for the business, calls in the queue that are waiting for an agent, abandoned calls, ghost calls, hang-up calls, handled calls and available agents.

As was mentioned above, a user may activate the view menu to change to the view displayed within the window 90. The user may also change the view by positioning a mouse cursor at locations within a section of the view displayed within the window 90 and clicking a mouse button. FIG. 6 identifies the hot spots within the depiction of the call center that may be used to change the view from a call center view to a bay view or a pod view. FIG. 6 shows the depiction of a bay 132 and indicates that positioning a mouse cursor in proximity to the area pointed to by arrow 134 and clicking results in a bay view being displayed within the window 90. If, however, a user positions a mouse cursor to point to the hot spots indicated by arrows 136A or 136B and clicks, a pod view for the pod associated with a respective hot spot is displayed within the window 90.

Figure 7:
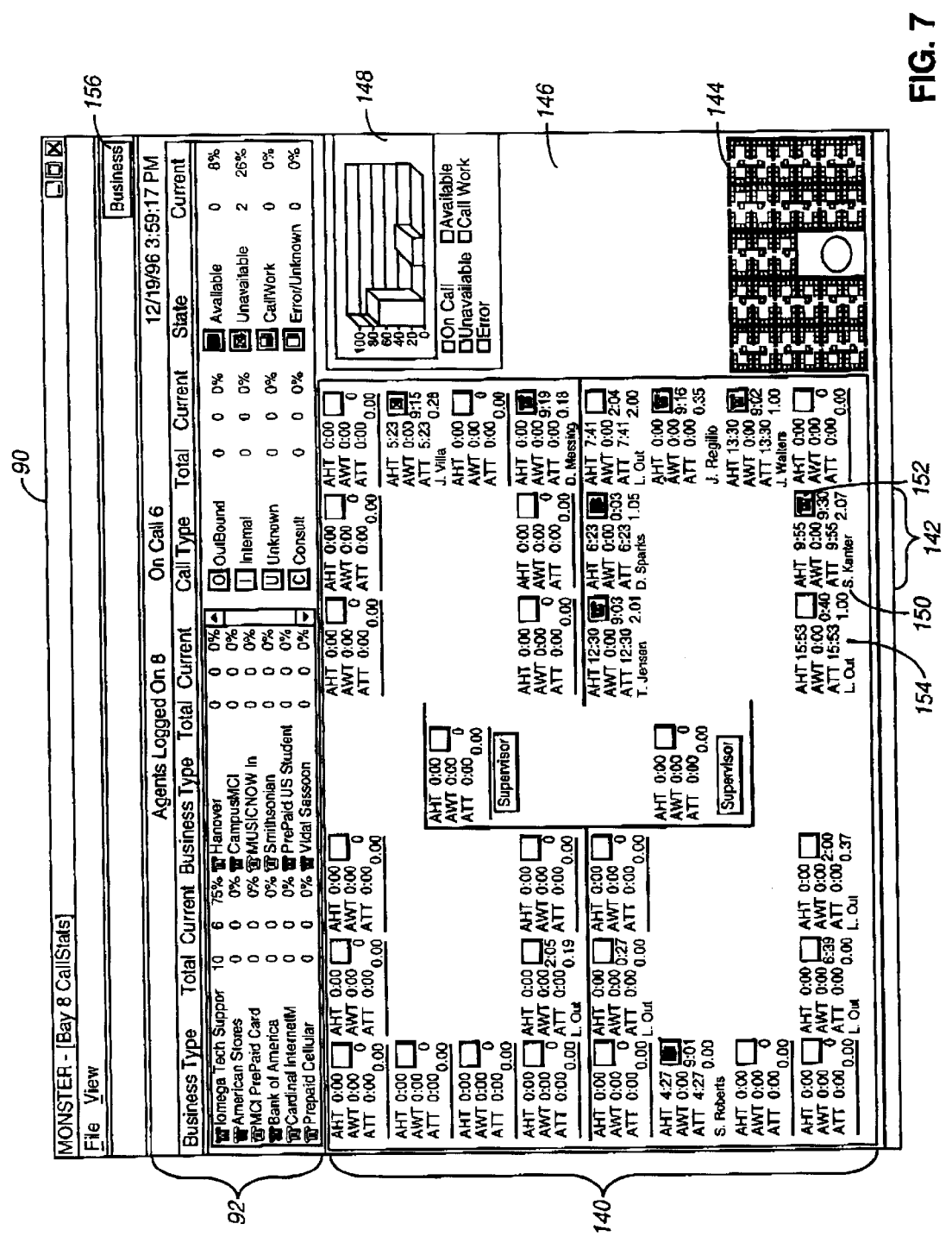

FIG. 7 shows an example of a bay view. The bay view may either hold statistical information or business client information. In FIG. 7, the bay view holds statistical information. As can be seen in FIG. 7, the entire call center layout is not displayed within the window 90 but rather only a single bay 140 is depicted within the window 90. The statistics section 92 holds information only as to activity relative to the bay that is shown. Information 142 regarding each agent within the bay is shown. This information includes the name 150 of the agent and an icon 152 on a button that indicates either the state of the agent, the call type or the business type. This icon is like that found for agents in the call center view. A set of statistics 154 is also displayed for each agent. The statistics include the average handling time (AHT), which specifies the time it takes on average for an agent to handle (i.e., fully process) a call. The statistics 154 also include the average work time (AWT), which identifies the time at which the agent is processing the call but not talking, and the average talk time (ATT), which specifies the average amount of time that the agent is talking on a call. The AHT is the sum of the AWT and ATT.

Graphical data 148 depicting the percentage of agents that are on call, unavailable, available or in an error state is depicted within the bay view. The bay view also includes a condensed view 144 of the call center. The bay 146 currently being displayed is highlighted in the condensed view 144 to indicate position of the bay within the call center. A "Business" button 156 may be displayed and activated to change the view to show business segment information for the bay rather than call statistics for the bay.

Figure 8:
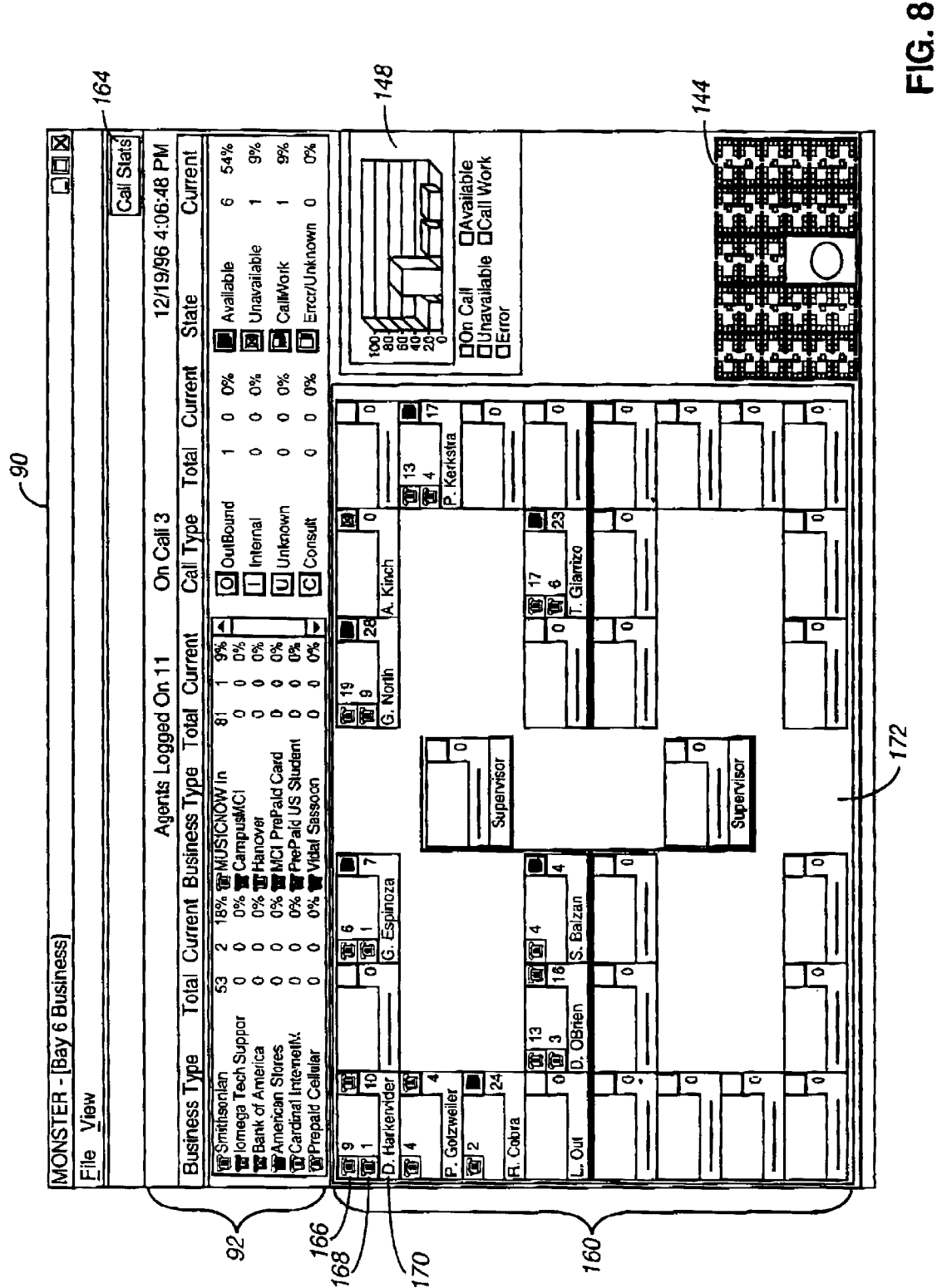
FIG. 8 is a screen shot that depicts a window produced by the monitoring system client where business client information is displayed that contains call statistics.

FIG. 8 depicts an example of an instance wherein the business client information is shown for a bay view. Graphical data 148 and a condensed view 144 of the call center layout are still displayed. Similarly, the statistics section 92 holds statistical information regarding calling activity for the bay. The information that is displayed per agent, however, differs. The name 170 of the agent is still displayed but only information regarding business clients are displayed. In particular, an icon identifying a business client and the associated number of calls that have been processed for the business client are displayed. For example, icon 166 is associated with the first business and the display shown in FIG. 8 indicates that nine calls have been processed by the given agent for that business. Icon 168 is associated with a different business and the display indicates that only a single call has been processed by the agent for that business The window 90 may include a "CallStats" button 164 that may be activated to show call statistics information for the bay view rather than business client information.

Figure 9:
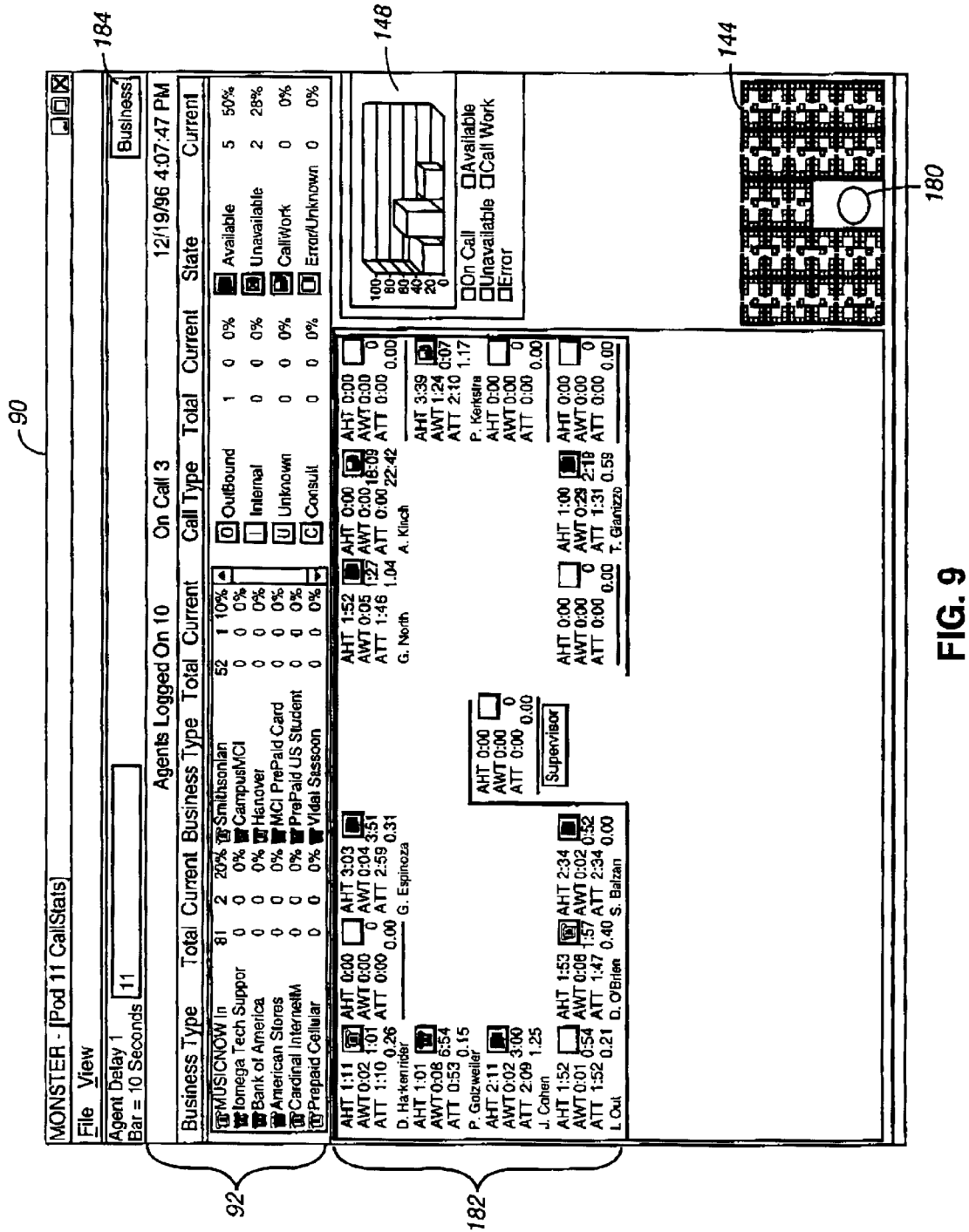
FIG. 9 is a screen shot that depicts a window produced by the monitoring system client that contains a pod view.

As was mentioned above, the view may also show only a single pod (i.e., half of a bay). FIG. 9 depicts an instance wherein a pod view for a pod 182 is displayed. The information is like that shown for the bay view but contains only information for the agents within the given pod. The statistics, section 92 holds information for the pod and the graphical data 148 is for the pod. The condensed view 144 of the call center layout shows a highlighted section 180 that is associated with the pod. As in the bay view, a user may choose to show call statistics information or business client information for the agents. A "Business" button 184 may be activated to toggle to the business segment information for the pod.

Figure 10:
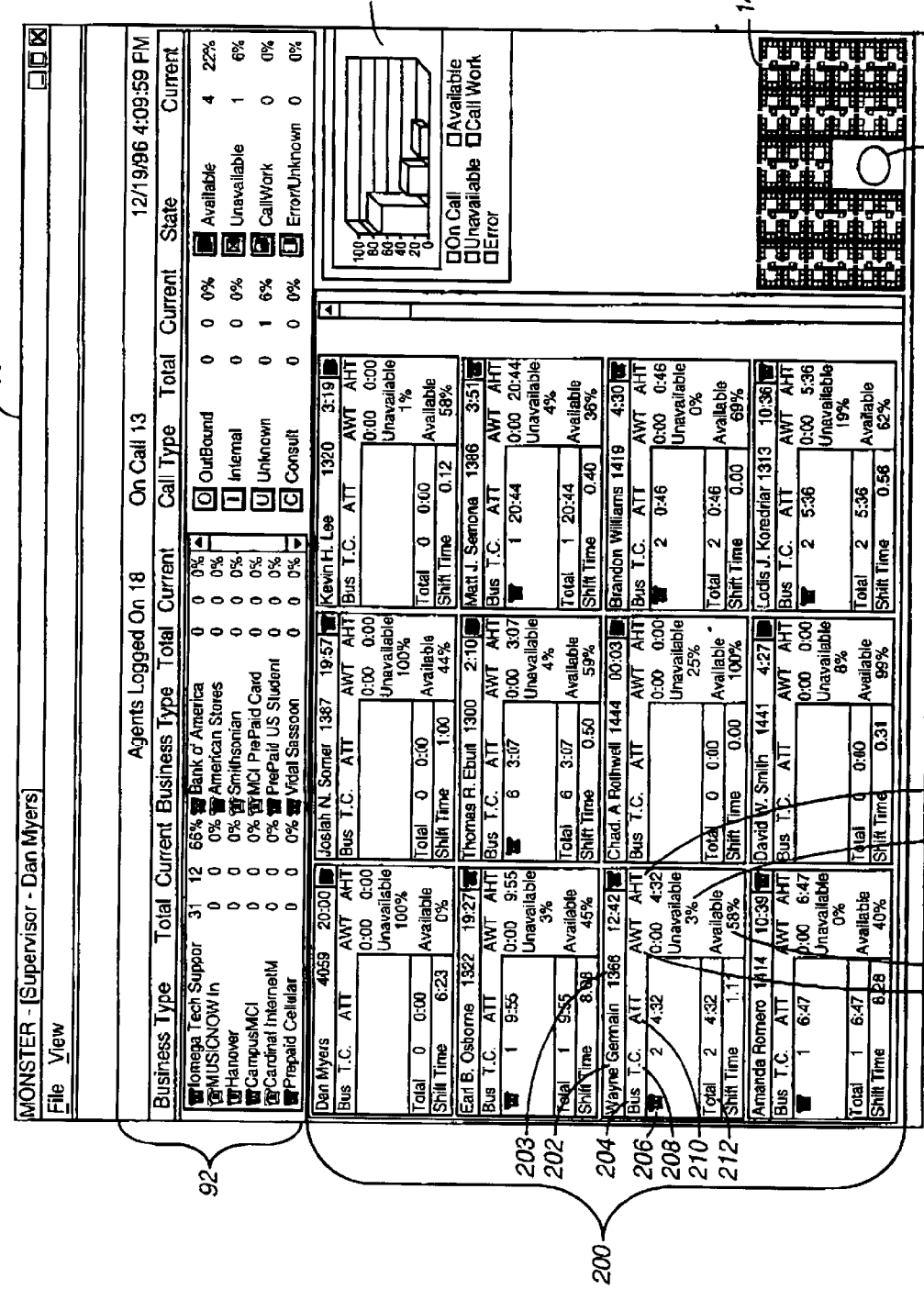
FIG. 10 is a screen shot that shows a window produced by the monitoring system client wherein a supervisor view is displayed.

A supervisor view for a given supervisor may also be displayed (see FIG. 10). The supervisor view shows a statistic section 92 that holds statistics for the agents under the supervisor. A graphical section 200 shows statistics regarding each of the agents. The information includes the name 202 of the agent and a phone identifier 203 for the agent. A table of call information is displayed that includes a column 204 that may hold icons 206 for the given business client, a column 208 that identifies the total number of calls processed by the agent for the business and the average talk time (ATT) for the calls processed for the business. Totals 212 for the table are displayed as well. Statistics 214 regarding the average working time (AWT) are displayed along with statistics 216 for the average handling time (AHT). The percentage of time which the agent is unavailable 218 is displayed along with the percentage of time the agent is available 220.

Figure 11:
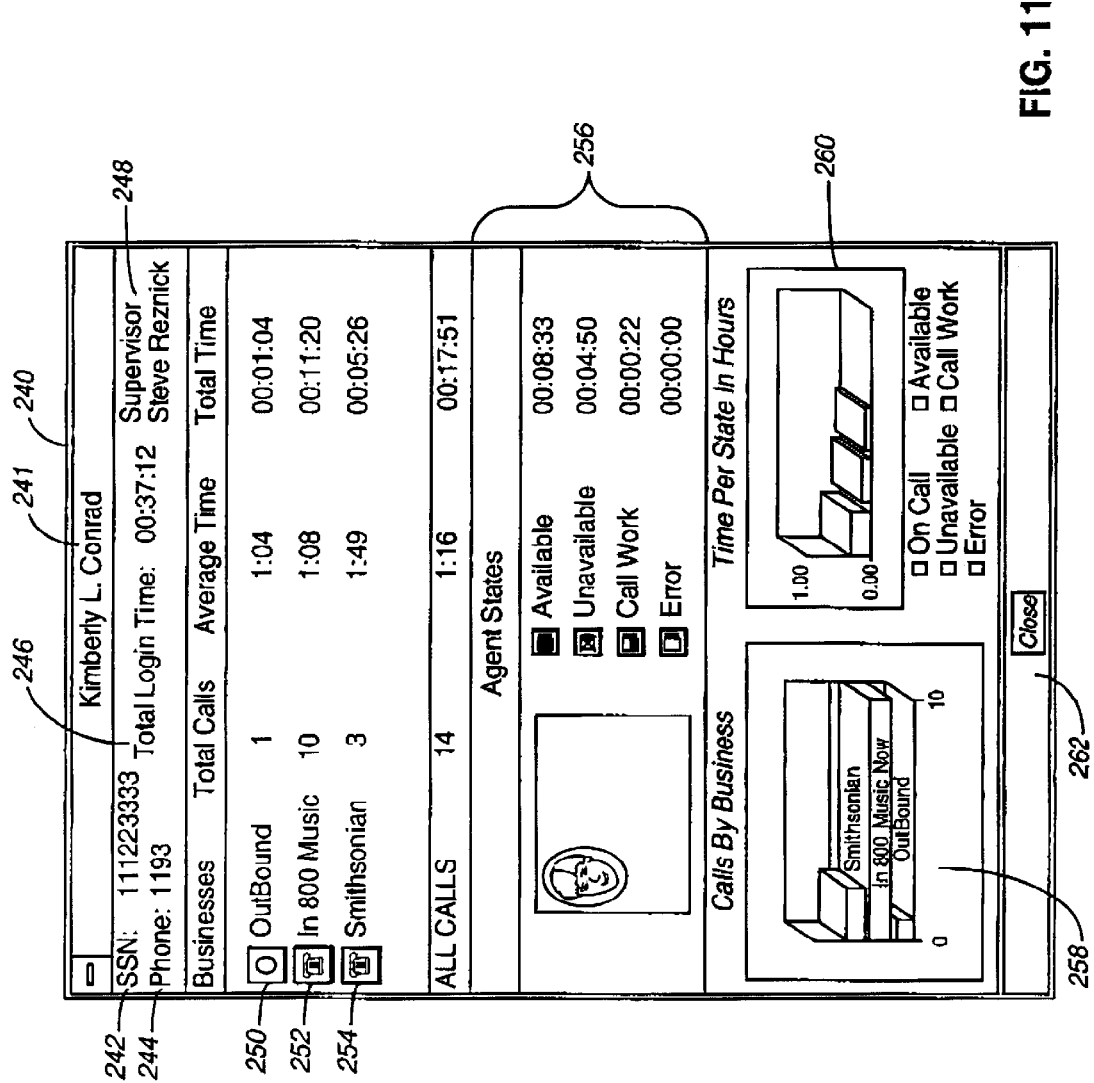
FIG. 11 depicts a pop-up window that displays agent information.

It should be appreciated that in any of the views, information regarding an agent may be obtained by positioning a mouse cursor over the button (i.e., rectangle) associated with an agent in the given view and activating the button by clicking a mouse button. FIG. 11 shows an example of an agent view window 240. The name 241 of the agent is displayed in the title bar of the window 240. The social security number 242 of the agent is displayed along with a phone identifier 244. The total time in which the agent has been logged in 246 is displayed. The name of a supervisor 248 is displayed as well. A table summarizing call processing for the agent by business segments is displayed. Each row 250, 252 and 254 holds information about the associated business segment. The total number of calls and the average time to handle a call are displayed within the associated row. The total amount of time spent on handling calls for the business are also displayed.

The window 240 includes a table 256 that summarizes how much time the agent has spent in a respective agent state. The window 240 also includes a graph 258 that shows the number of calls processed by the agent by business segment and a graph 260 that shows the time in which an agent has been in the respective agent states is included in the window 240. Lastly, a "Close" button 262 is provided to enable the pop-up window 240 to be closed.

The present invention has the benefit of enabling a supervisor or other party to view information regarding call processing activity within the call center. The supervisor may readily change the view as needed and information contained within the views is updated regularly to be ensured to be current. Moreover, the information is shown in a variety of different formats that are useful to a supervisor.

While the present invention has been described with reference to a preferred embodiment thereof, those skilled in the art will appreciate that various changes in form and detail may be made without departing from the intended scope of the present invention as defined in the appended claims. For example, the user interface may differ from that shown in the figures. Moreover, the monitoring system client may be run on agents workstations or other workstations that differ from the supervisor/control workstations. Still further, the monitoring system client may be run at a remote computer outside of the call center.

What is claimed is:

1. In a computer system having a display device, a method of monitoring activity of an agent within a call center having a physical layout, comprising the computer-implemented steps of:

displaying a first graphical user interface on the display device, said first graphical user interface depicting at least a portion of the physical layout of the call center;

receiving status information regarding activity of the agent;

as part of the first graphical user interface, displaying graphical information about the agent that provides a visual cue of the received status information to a user of the computer system, wherein the graphical information about the agent is displayed on an activatable user interface element within the first graphical user interface that is activated to cause a second graphical user interface to be displayed on the display device that holds further information about the agent, and wherein the first and second graphical user interfaces appear simultaneously on the display device.

2. The method of claim 1 wherein the graphical information is an icon that identifies activity of the agent.

3. The method of claim 1 wherein the graphical information indicates that the agent is on a call.

4. The method of claim 1 wherein the graphical information indicates that the agent is on an outbound call.

5. The method of claim 1 wherein the graphical information indicates that the agent is unavailable.

6. The method of claim 1 wherein the graphical information indicates that the agent is available.

7. The method of claim 1, further comprising the steps of:

receiving statistical information regarding calling activity by the agent; and displaying statistics about the calling activity by the agent.

8. The method of claim 1, further comprising the steps of:

receiving an indication that activity by the agent has changed;

altering the graphical information about the agent that is displayed as part of the graphical user interface to reflect that activity by the agent has changed.

9. The method of claim 1 wherein the graphical user interface depicts an entire physical layout of the call center.

10. The method of claim 1 wherein the graphical user interface depicts only a portion of the physical layout of the call center.

11. In a computer system having a display device, a method of monitoring activity in a call center having agent stations where agents are stationed to process calls comprising the computer-implemented steps of:

displaying a first user interface on the display device that depicts agent stations for at least a selected portion of the call center;

receiving information about calling activity at the agent stations; and displaying information about calling activity at the agent stations in the selected portion of the call center as part of the first user interface wherein the information for each agent station is displayed in proximity to the depiction of the agent station in the user interface, and wherein the graphical information about the agent is displayed on an activatable user interface element within the first user interface that is activated to cause a second user interface to be displayed on the display device that holds further information about the agent, and wherein the first and second user interfaces appear simultaneously on the display device.

12. The method of claim 11 wherein a separate graphical representation of each agent station in the selected portion of the call center is shown as part of the user interface.

13. The method of claim 11 wherein the graphical representation is a button.

14. The method of claim 11 further comprising the step of showing summary statistics that summarize activity at the agent stations of the selected portion of the call center as part of the user interface.

15. The method of claim 11 wherein the call center fields calls for multiple clients and wherein the summary statistics include how many calls have been fielded for the respective clients.

16. The method of claim 11, further comprising the step of altering what portion of the call center is displayed as part of the user interface.

17. The method of claim 16 wherein the altering is performed in response to a request by a user.

18. In a call center for processing calls on behalf of clients, said call center including agent stations where agents are stationed to process calls, a server for generating information regarding calling activity by agents and a computer system having an output device and a program for producing a graphical user interface, a method performed by the computer system comprising the computer-implemented steps of:

receiving information regarding calling activity from the server;

determining what view of the call center to display, each view constituting a subset of the agent stations in the call center;

displaying a first graphical user interface that depicts each of the agent stations within the determined view; and displaying information about calling activity of agents stationed at agents station in the determined view as part of the first graphical user interface, wherein the information about the calling activity of the agents is displayed on an activatable user interface element within the first graphical user interface that is activated to cause a second graphical user interface to be displayed on the display device that holds further information about the agents, and wherein the first and second graphical user interfaces appear simultaneously on the display device.

19. The method of claim 18 wherein the determined view constitutes all of the agent stations in the call center.

20. The method of claim 18 call center is divisible into bays and wherein the determined view constitutes a selected bay of the call center.

21. The method of claim 18 wherein the call center is divisible into bays which are further divisible pods and wherein the determined view constitutes a pod of the call center.

22. The method of claim 18 further comprising the step of display summary statistics for aggregate calling activity by agents in the determined view.

23. A computer system comprising:

a display device; and a processor running a program for generating a first graphical user interface for display on the display device that depicts at least a portion of a call center having agent stations where agents are stationed to process calls and that displays information regarding calling activity by agents in the portion of the call center, wherein the calling activity by the agents is displayed on an activatable user interface element within the first graphical user interface that is activated to cause a second graphical user interface to be displayed on the display device that holds further information about the agents, and wherein the first and second graphical user interfaces appear simultaneously on the display device.

24. The computer system of claim 23 wherein the information regarding calling activity includes statistics regarding time spent handling calls.

25. The computer system of claim 23 wherein the information regarding calling activity includes graphical output that identifies current calls activity.

26. In a computer system having a display device, a computer-readable medium holding computer-executable instructions for performing a method of monitoring activity of an agent within a call center having a physical layout comprising the computer-implemented steps of:

displaying a first graphical user interface on the display device, said first graphical user interface depicting at least a portion of the physical layout of the call center;

receiving status information regarding activity of the agent; and as part of the first graphical user interface displaying graphical information about the agent that provides a visual cue of the received status information to a user of the computer system, wherein the graphical information about the agent is displayed on an activatable user interface element within the first graphical user interface that is activated to cause a second graphical user interface to be displayed on the display device that holds further information about the agent, and wherein the first and second graphical user interfaces appear simultaneously on the display device.

27. The computer-readable medium of claim 26 wherein the graphical information is an icon that identifies activity of the agent.

28. The computer-readable medium of claim 26 wherein the method further comprises the steps of:

receiving statistical information regarding calling activity by the agent; and displaying statistics about the calling activity by the agent.

29. The computer-readable medium of claim 26 wherein the method further comprises the steps of:

receiving an indication that activity by the agent has changed:

altering the graphical information about the agent that is displayed as part of the graphical user interface to reflect that activity by the agent has changed.

30. The computer-readable medium of claim 26 wherein the graphical user interface depicts an entire physical layout of the call center.

31. In a computer system having a display device, a computer-readable medium holding computer-executable instructions for performing a method of monitoring activity in call center having agent stations where agents are stationed to process calls comprising the computer-implemented steps of:

displaying a first user interface on the display device that depicts agent stations for at least a selected portion of the call center;

receiving information about calling activity at the agent stations; and displaying information about calling activity at the agent stations in the selected portion of the call center as part of the first user interface wherein the information for each agent station is displayed in proximity to the depiction of the agent station in the user interface, and wherein the information about the calling activity at the agent stations is displayed on an activatable user interface element within the first user interface that is activated to cause a second user interface to be displayed on the display device that holds further information about the agent, and wherein the first and second user interfaces appear simultaneously on the display device.

32. The computer-readable medium of claim 31 wherein a separate graphical representation of each agent station in the selected portion of the call center is shown as part of the user interface.

33. The computer-readable medium of claim 31 wherein the method further comprises the step of showing summary statistics that summarize activity at the agent stations of the selected portion of the call center as part of the user interface.

34. The computer-readable medium of claim 31 wherein the call center fields calls for multiple clients and wherein the summary statistics show how many calls have been fielded for the respective clients.

35. The computer-readable medium of claim 31 wherein the method further comprises the step of altering what portion of the call center is displayed as part of the user interface.

36. In a call center for processing calls on behalf of clients, said call center including agent stations where agents are stationed to process calls, a server for generating information regarding calling activity by agents and a computer system having an output device and a program for producing graphical user interfaces, a computer-readable medium holding computer-executable instructions for performing a method performed by the computer system comprising the computer-implemented steps of:

receiving information regarding calling activity from the server;

determining what view of the call center to display, each view constituting a subset of the agent stations in the center;

displaying a first graphical user interface that depicts each of the agent stations within the determined view; and displaying information about calling activity of agents stationed at agent stations in the determined view as part of the first graphical user interface, wherein the information about the calling activity of the agents is displayed on an activatable user interface element within the first graphical user interface that is activated to cause a second graphical user interface to be displayed on the display device that holds further information about the agents, and wherein the first and second graphical user interfaces appear simultaneously on the display device.

37. A method of monitoring activity of an agent within a call center having a physical layout, comprising the computer-implemented steps of:

displaying, on a display device, a first graphical user interface that depicts at least a portion of the physical layout of the call center;

receiving status information regarding activity of the agent; and displaying graphical information about the agent that provides a visual cue of the received status information to a user of the computer system, wherein the graphical information about the agent is displayed within the first graphical user interface, wherein the first graphical user interface is activated to cause a second graphical user interface to be displayed on the display device, wherein the second graphical user interface holds further information about the agent, and wherein the first and second graphical user interfaces appear simultaneously on the display device.

38. The method of claim 37, wherein the graphical information is an icon that identifies activity of the agent.

39. The method of claim 37, wherein the graphical information indicates that the agent is on a call.

40. The method of claim 37, wherein the graphical information indicates that the agent is on an outbound call.

41. The method of claim 37, wherein the graphical information indicates that the agent is available.

42. The method of claim 37, further comprising the steps of:

receiving statistical information regarding calling activity by the agent; and displaying statistics about the calling activity by the agent.

* * * * *